United States Patent

[11] 3,627,576

[72] Inventors Helmut Knorre
 Hainstadt/Main;
 Gunter Reiff, Kleinosthein, both of
 Germany
[21] Appl. No. 753,780
[22] Filed Aug. 19, 1968
[45] Patented Dec. 14, 1971
[73] Assignee Deutsche Gold- und Silber-Scheideanstalt
 Vormals Roessler
 Frankfurt/Main, Germany
[32] Priority Aug. 18, 1967
[33] Germany
[31] P 16 21 232.1

[54] PROCESS FOR ADHERENT METALLIZING OF SYNTHETIC RESINS
 10 Claims, No Drawings
[52] U.S. Cl. .................................................. 117/213,
 117/47 A, 117/160, 117/138.8, 117/227, 204/30,
 156/2
[51] Int. Cl. ........................................................ B44d 1/40,
 C23b 5/62
[50] Field of Search ............................................. 204/30;
 117/213, 138.8 E, 138.8 F, 138.8 G, 138.8 J, 47 A;
 156/2

[56] References Cited
 UNITED STATES PATENTS
3,546,009 12/1970 Schneble et al. ............... 117/212
3,560,257 2/1971 Schneble et al. ............... 117/212
3,146,125 8/1964 Schneble et al. ............... 117/213
3,399,268 8/1968 Schneble et al. ............... 117/213
3,466,232 9/1969 Francis et al. .................. 156/2
3,416,992 12/1968 Amos ............................. 117/213
3,259,559 7/1966 Schneble et al. ............... 117/212
3,269,861 8/1966 Schneble et al. ............... 117/212
3,347,724 10/1967 Schneble et al. ............... 117/47
3,370,974 2/1968 Hepfer ........................... 117/47
3,245,826 4/1966 Luis et al. ....................... 117/67
2,690,401 9/1954 Gutzert et al. .................. 117/160
2,454,610 11/1948 Narcus ........................... 117/35
3,305,460 2/1967 Lacy .............................. 117/47

Primary Examiner—William D. Martin
Assistant Examiner—M. Sofocleous
Attorneys—Francis D. Stephens and Hugo Huettig, Jr.

ABSTRACT: Synthetic resins having adherent electrically conductive metal coatings on their surfaces are produced by preparing the synthetic resin A to be metallized by incorporating therein (1) a polymeric material having a relatively low softening temperature range and which is capable of being attacked oxidatively by the usual conditioning baths, such as, chromosulfuric acid, and (2) a finely divided filler which is capable of binding the catalyst required through functional groups and effecting chemical metallization of the thus prepared combination.

PROCESS FOR ADHERENT METALLIZING OF SYNTHETIC RESINS

RELATED APPLICATIONS

The copending applications of Kallrath et al., Ser. No. 593,736, filed Nov. 14, 1966, and now abandoned and Knorre et al., Ser. No. 719,017, filed Apr. 5, 1968, now U.S. Pat. No. 3,546,011, are related to the present application and the disclosure thereof are incorporated by reference in the present application.

BACKGROUND OF THE INVENTION

The application relates to a process for the adherent metallizing of synthetic resins, especially, upon parts produced by injection molding or extrusion, by the nonelectrolytic deposition of an electrically conductive metallic layer from a predominantly aqueous metal salt solution containing a reducing agent in the presence of metals catalyzing the deposit of metals in which the base for anchoring the adherent metal coating is provided by a special pretreatment.

A number of processes are already known which render it possible to clad practically any desired synthetic resin with a metal coating. The best known are the vacuum coating method in which a metal coating is deposited from metal vapors under high vacuum and the chemical reductive deposition of metals from solutions. In most instances, however, the coatings deposited are not very adherent so that the use of the articles metallized thereby is more or less limited to decorative purposes. Nevertheless, there has been no lack of attempts to find ways to provide adherent metal coatings on synthetic resins.

For example, a process has become known in DAS U.S. Pat. No. 1,225,940 for the vacuum deposition of an adherent metal coating on a base of halogenated polyethylene in which an anchoring intermediate metal oxide coating is provided by cathode sputtering. This special process, just as the vacuum coating process, in itself is very costly and in view of the high vacuum techniques required is necessarily limited with regard to dimensions.

As a result the art turned to other more economical processes for producing adherent metal coatings, among which the nonelectrolytic deposit of metals coatings on certain types of ABS (acrylonitrile-butadiene-styrene) resins has particularly become known. In such process the adherent anchoring of a metal coating obtained by reductive chemical deposition is attained by a chemical pretreatment of the synthetic resin part to be metallized to effect a roughening of its surface. Such process, however, has the following disadvantage: It is limited in its application to a very definite synthetic resin type which very greatly limits the synthetic resin properties which in turn limits the field of application of the metallized parts which are produced. Furthermore, the capability of this type of synthetic resin of being metallized and the adherence of the metal coatings produced depends to a great extent upon the synthesis and the further processing (extrusion temperature and velocity), as well as the corresponding pretreatments resulting therefrom.

According to another proposal (U.S. application Ser. No. 593,736) adherent metal coatings can be produced on synthetic resins, which are not limited to any particular resin types, but also in addition avoid the disadvantages of the pretreatment of the ABS resin types mentioned above. According to this process, the synthetic resin is prepared with a filler which, on one hand, is capable of chemically binding the catalysts required through functional groups and, on the other hand, effects the necessary surface roughness after a pretreatment of the filled synthetic resin with chromosulfuric acid and aqueous NaOH.

It was, however, found that this process can only be carried out with good success with pressed plates, whereas difficulties are encountered with parts which are produced at present by the usual more rational processes, such as, injection molding or extrusion. Good metallization and adherence could only be attained with injection molded or extruded parts of the synthetic resins prepared with the fillers as described above if very high degrees of filling are used or if the pretreatment which with chromosulfuric acid and NaOH was extended to an extremely long period. Both, however, preclude a practical metallizing process. Normally with inclusions of increased quantities of fillers the incorporation of such filler in the resin and the thermoplastic processing of the filled resin are rendered more difficult. In addition, in some instances undesirable changes in the properties occur. The usual methods for incorporating larger quantities of fillers in this instance cannot be used as they either cause an undesirable change in the properties of the synthetic resins and/or they are unsuited for metallization. On the other hand, the long times required for pretreatment are not practical in metallizing processes as the times of the various steps must be uniformly adjusted with respect to each other and be relatively short in automatic metallizing and, on the other hand, there is the danger of damage to the synthetic resin.

DESCRIPTION OF THE INVENTION INCLUDING PREFERRED EMBODIMENTS

It is the object of the invention to provide a process for adherent metallizing of synthetic resins by the nonelectrolytic deposit of an electrically conductive metal coating from an aqueous metal salt solution containing a reducing agent in the presence of metals catalyzing such deposit which renders it possible to provide adherent metal coatings on synthetic resin articles produced by usual presently used economical processing methods, such as, injection molding or extrusion. According to the invention this object is attained by incorporating a filler (B) which is capable of binding the catalyst required for the metallizing through functional groups and which also effects the necessary roughening of the surface for the anchoring of an adherent metal coating of the synthetic resin composition to be metallized and one or more polymers or copolymers or mixtures thereof (C) which have a relatively low softening range, preferably, from 30° to 100° C., and which are attacked oxidatively in the usual conditioning baths used for metallizing, preferably, chromosulfuric acid and/or are capable of forming functional groups, such as, for example, hydroxyl, carboxyl, or sulfonic acid groups by a suitable pretreatment, into the synthetic resin base (A) which is to be metallized and subsequently metallizing the thus prepared synthetic resin in a known way by a chemical metallizing procedure and, if desired, galvanically depositing a metallic coating on the thus metallized resin.

The following requirements must be met in the combination of synthetic resin (A) plus filler (B) plus polymer (C):

The polymer (C) which is added to synthetic resin (A) must be compatible therewith and should ease the working in of larger and/or very voluminous quantities of filler into the synthetic resin (A). Furthermore, good processing properties of the synthetic resin combination which permit processing on usual processing apparatus, the ability to form unobjectionable surfaces, and a rational and firmly adherent metallizing should be assured.

These requirements are fulfilled in an almost ideal manner by the combination according to the invention as in the pretreatment of the synthetic resin combination in conditioning baths such combination provides for a change in the surface characteristics so that the adherent metallization rendered possible by the added filler can be carried out in a rational manner. The incorporation of polymers, copolymers or their mixture (C) by themselves into an unfilled synthetic resin (A) only provides for inconsequential improvements with regard to adherent metallization. To the contrary, their addition without addition of filler renders the metallizing process more difficult in view of factors of uncertainty occurring in the pretreatment and furthermore they also impair certain physical properties of the metallized product which are important for their use. Unexpectedly, however, they assist the activating process without sensitization with stannous chloride or other reducing agents.

As the sensitization step as well as the apparatus therefore are not required, it is possible to omit the normally necessary transfer of the synthetic resin parts to supports which are not wetted with stannous chloride. In addition, in the process according to the invention only as much activator as is actually necessary is deposited on the surface of the synthetic resin; this signifies that the metallization cannot be injured by under or over activation and as a consequence faulty metallization can be prevented to a far reaching degree. In addition, significant advantages are attained by the omission of the sensitization, for instance, in the printed circuits in which above all the presence of stannous chloride is disturbing when contacts are made between conductive circuits.

The addition of the polymers, copolymers and/or mixtures thereof (C) according to the invention facilitate the incorporation of larger quantities of fillers (B) in the synthetic resin (A) and the processing of such filled resins (ABC) to parts ready for metallization in that they increase the ability of the resin to take up fillers and at the same time improve the poor flow characteristics normally caused by the incorporation of larger quantities of fillers so that they approximate those of the unfilled resins. This also renders it possible to attain sufficiently smooth surfaces such as are desired for the metallization and use of the parts produced.

Polymers, copolymers or mixtures thereof which have a relatively low softening range, preferably, of from 30° to 100° C., and which have the requisite compatibility with synthetic resin (A) which is to be metallized and in addition can be attacked oxidatively in the usual conditioning baths, such as, chromosulfuric acid, and/or can form functional groups, such as, hydroxyl, carboxy or sulfonic acid groups by a suitable pretreatment or which already possess functional groups, have proved especially suited for the process according to the invention. Depending upon the type of polymer (C), the filler (B) and the resin (A) to be metallized and the use to which the metallized object is to be put, the additions of the polymer (C) should lie in the order of 1 to 40 wt. percent, preferably, 5 to 15 percent, with reference to the weight of synthetic resin (A).

Examples of such metallizing promoting polymer additions (C), for instance, are polyvinyl acetate, polyisobutylene, copolymers of ethylene, propylene and higher olefins, as well as vinyl chloride with vinyl acetate, isobutylene, acrylic acid esters, methacrylic acid esters, butadiene and acrylonitrile or corresponding polymer mixtures of polyethylene, polypropylene, higher olefins and polyvinyl chloride with polyvinyl acetate, polyisobutylene, poly acrylic acid esters, polymethacrylic acid esters and polyacrylonitrile.

The additions according to the invention (BC) are expediently incorporated into synthetic resin (A) by first forming a mixture of the filler (B) which is suited for the metallization with the metallization promoting polymers, copolymers or polymer mixtures (C) and then working such mixture into the resin (A). However, it also is possible first to mix the resin (A) with polymeric material (C) and then working the filler (B) into such mixture. Instead of mixtures of the resin (A) to be metallized with the polymeric materials (C) which promote metallization and fillers (B), it is also possible to form the composition according to the invention to be metallized from copolymers of resin (A) with polymeric material (C) and the filler (B). It also is possible to cross-link synthetic resin (A) and/or the polymeric material (C).

Inorganic finely divided substances with a secondary particle size between 0.1 and 150µ, preferably, between 0.2 and 20µ, which contain hydroxyl groups or are capable of having such hydroxyl groups formed therein by suitable pretreatment so that, for example, $Ag^{}$ or $Pd^{**}$ ions can be chemically bound from an ammonical solution, have been found particularly suited as fillers promoting metallization. Wet precipitated or pyrogenic metal or metalloid oxides, such as silica, titanium dioxide, alumina in the form of single oxides, mixtures of such oxides, so-called mixed oxides (in which each primary particle already consists of a mixture of the oxides) or co-coagulates wherein the secondary particles are formed by co-coagulation of separately formed primary particles or different oxides have, for example, been found suited.

The metallizing process according to the invention is especially practical when alkali metal and/or alkaline earth metal and/or alumo-silicates, which do not require a treatment with aqueous NaOH to effect a corresponding conditioning of the resin surfaces, are used as the fillers. Synthetic resins produced with the last-mentioned fillers only need be given a pretreatment with the conventional chromosulfuric acid baths in order that they be degreased, hydrophilized and conditioned simultaneously. This renders it possible in practice to use the same apparatus for metallizing ABS resins and for metallizing the combinations (ABC) according to the invention.

In general, in carrying out the process according to the invention, the synthetic resin (A) which is to be metallized is mixed, in the form of a granulate or powder as normally used in synthetic resin processing, with corresponding portions of the polymeric material (C) and with filler (B), for instance, in a weight proportion of 70:10:20. To effect further homogenization and/or plastification such mixture is, for example, treated in a heated punch kneader or on mixing rolls or in an extruder, preferably, at temperatures between 140° and 200° C. Before processing the semifinished or finished parts, this mixture is expediently formed into granules or agglomerates. The semifinished or finished parts produced on usual processing machines can then be metallized in the following processing operation.

After treatment in hot chromosulfuric acid (about 60° C.) the synthetic resin parts are activated in an ammoniacal silver nitrate bath and subsequently provided with an electrically conductive metal layer in a conventional chemical metallizing bath, preferably, a chemical copper plating bath. The metal layer then, if desired, can be thickened in conventional galvanic baths and, depending upon the intended use, covered with decorative covering layers such as bright copper, bright nickel, bright chromium and the like.

In order to test the adhesive strength of the coating obtained in the chemically metallized samples, the coating can be thickened in a galvanic copper plating bath to a thickness of 100µ and the samples then be subjected to the peeling test according to DIN 40802. The synthetic resins which have been metallized using the process according to the invention always gave values which were far above the minimum value of 0.9 kg./cm. required for metallized ABS synthetic resins. The optimal values obtained with the synthetic resins prepared according to the invention as described above are up to around 5 kg./cm. and when an additional preconditioning bath of aqueous NaOH was employed adhesive strengths of up to about 6 kg./cm. can be obtained. The adhesive strength increases with increasing degree of filling. 5 wt. percent of filler in homogeneous distribution in the resin is considered the minimum degree of filling. The quantity of filler employed can, for example, be between 5 and 70 wt. percent and preferably is between about 5 and 30 wt. percent with reference to synthetic resin (A).

The adhesive strength in addition is dependent upon the duration of the conditioning in the chromosulfuric acid and this again is dependent upon the quantity and type of the metallization promoting polymeric material (C) which is added. For example, with a 10 percent addition of a copolymer of ethylene and vinyl acetate to polyolefins (A) optimum adhesive strength values are obtained with conditioning periods of 5–15 minutes in chromosulfuric acid. The chromium VI content of the sulfuric acid should not be under 5 percent $CrO_3$/liter and preferably should be between 7 and 20 percent $CrO_3$/liter. An addition of phosphoric acid to the chromosulfuric acid is not necessary in the process according to the invention, but such addition is not disturbing.

It has also been found that the adhesive strength of the metal coatings produced according to the invention after being subjected to repeated cycles of hot and cold, for example, between +120° and −40° C. when the synthetic resin base (A) is polyethylene, is not substantially impaired.

The process according to the invention is applicable for the metallization of all synthetic resins (A)

a. which are stable against the etches, such as, chromosulfuric acid, or leaches, such as, aqueous NaOH which are required for conditioning of the surface and are not or only immaterially attacked thereby (excepting the hydrophobization of the synthetic resin surface)

b. which in combination with the polymeric material (C) can be prepared homogeneously or superficially with 5–40 percent of the fillers (B) according to the invention c. which are compatible with polymeric materials (C) and fillers (B) to give a solid, injection moldable and/or extrudable and/or compression moldable mixture.

Illustrative examples of such synthetic resins (A), for example, are thermoplastic resins, such as, polyolefins, such as polyethylene and polypropylene, polyvinyl chloride, polyformaldehyde, ABS resins and duroplastic resins, such as, phenol aldehyde and epoxy resin.

The treatment employed according to the invention to introduce the hydroxyl groups into the finely divided fillers employed according to the invention, if they are not already present therein, such as, for instance, when finely divided carbonates or natural minerals, such as, corundum, natural silicates, as well as other finely divided natural minerals, can, for example, be with hot aqueous NaOH.

The following examples will serve to illustrate the invention.

EXAMPLE 1

The following synthetic resin-filler mixtures were produced in a punch kneader:

a. polypropylene (A) with 20 percent of wet precipitated silica (B) (with 6 percent silanol groups and a secondary particle size of 1–5$\mu$)

b. polypropylene (A) with 20 percent calcium silicate (B) (72 percent $SiO_2$, 10 percent CaO, 6 percent silanol groups, secondary particle size 10$\mu$)

c. polypropylene (A) with 8 percent ethylene-vinyl acetate copolymer (C) (about 15 percent vinyl acetate) and 20 percent precipitated silica as under (a)

d. polypropylene (A) with 8 percent ethylene-vinyl acetate copolymer (C) (about 15 percent vinyl acetate) and 20 percent calcium silicate as under (b)

e. polypropylene (A) with 8 percent ethylene-vinyl acetate copolymer (C) (about 15 percent vinyl acetate) without filler.

The mixtures were then granulated with an extruder and subsequently extruded to form plates. Both during the working in of the filler and during the subsequent processing of the filled synthetic resin mixtures, mixtures (c) and (d) exhibited significantly improved processing properties and a more favorable (smoother) surface formation when compared with mixtures (a) and (b).

A plate from each of the mixtures (a) through (e) and a plate of pure polypropylene were placed on a support and dipped for 5 minutes in 60° C. chromosulfuric acid bath (about 7 percent $CrO_3$/liter) and rinsed thereafter for 15 minutes in hot tap water and then dipped for 15 minutes in an ammoniacal silver nitrate solution (2.0 g. $AgNO_3$/liter) and then after repeated rinsing with water introduced into a chemical copper plating bath (7 g. $CuSO_4 \cdot H_2O$, 34 g. Rochelle salt, 10 g. NaOH, 6 g. $Na_2CO_3$ and 100 ml. formaldehyde (40 percent per liter of aqueous bath with a bath load of 2 $dm.^2$/liter). All plates except that of pure propylene received a thin copper coating which was increased to a 100$\mu$ thick coating in a conventional galvanic copper plating bath (250 g./liter $Cu_2SO_4 \cdot H_2O$), 50 g./liter cc. $H_2SO_4$, 0.1 g./liter wetting agent; 0.5 to 2.0 A./$dm.^2$). After such galvanic treatment to increase the thickness of the copper coating, the coated samples were rinsed and dried for 25 hours in air and 24 hours in a drying cupboard at 50° C. and then subjected to the peeling test to determine the adhesive strength of the coatings obtained. The results were as follows:

(a) 0.3 kg./cm., (b) 0.2 kg./cm., (c) 3.2 kg./cm., (d) 4.2 kg./cm. and (e) 0.7 kg./cm.

EXAMPLE 2

Powdered polyethylene (A) was mixed in a fluid mixer with the substances or substance mixtures indicated in the following:

a. polyethylene (A) with 10 percent of wet precipitated silica (B) (with 6 percent silanol groups, secondary particle size 1–5$\mu$)

b. polyethylene (A) with 10 percent calcined silica (B) (secondary particle size 3–10$\mu$)

c. polyethylene (A) with 15 percent of sodium aluminum silicate (B) (72 percent $SiO_2$, 8 percent $Al_2O_3$, 7 percent $Na_2O$, secondary particles size 4$\mu$)

(d) through (f) as in (a) through (c) but with an additional 10 percent of polyisobutylene (C) (softening range 50°–70° C.).

The mixtures were granulated with an extruder and processed to plate shaped samples by injection molding. A plate of each of mixtures (a) through (f) and a plate of pure polyethylene were pretreated, metallized and tested for adhesive strength as in example 1. Again the pure polyethylene plate could not be metallized. The following adhesive strengths were attained:

(a) only metallized in spots, no adherence, (b) 0.2 kg./cm., (c) 0.3 kg./cm., (d) 1.6 kg./cm., (e) 2.1 kg./cm., (f) 3.15 kg./cm.

EXAMPLE 3

Samples of plates as in example 2 were again metallized as described in such example except that after the chromosulfuric acid treatment they also were given a treatment at 60° C. in aqueous 30 percent NaOH for 15 minutes. In this instance the following adhesive strengths were obtained:

(a) 0.4 kg./cm., (b) 0.5 kg./cm., (c) 0.35 kg./cm., (d) 1.8 kg./cm., (e) 4.2 kg./cm. and (f) 5.9 kg./cm. In this instance also the pure polyethylene plate could not be metallized.

The concentration of the aqueous NaOH conditioning baths which can be used according to the invention for the additional conditioning of the filler containing synthetic resin compositions can, for example, be between 40 and 400 g./l., preferably, about 300 g./l.

Additional illustrative examples of suitable polymeric material (C), for instance, are:

a. copolymers of ethylene and vinyl acetate with a softening range of 70°–90° C.

b. copolymers of ethylene and ethyl methacrylate with a softening range of 80°–90° C.

c. copolymers of ethylene and methyl acrylate with a softening range of 70°–90° C.

d. polymer mixtures of polyisobutylene and polyethylene with a softening range of 65°–80° C.

We claim:

1. In the method of electrolessly applying an adhering electrical conducting metal layer to the surface of a shaped synthetic resin substrate article, said article having been shaped by a prior fabrication, degreasing, hydrophilizing and conditioning the surface of said synthetic resin substrate article with a cleaning and conditioning liquid, exposing the degreased surface to a metal activating solution until the surface of said resin substrate article has become modified wherein said activating metal is selected from the group consisting of silver, palladium and mixtures thereof, and electrolessly depositing an electrically conducting metal on said activated surface the improvement which comprises forming said synthetic resin substrate article from a mixture consisting of (A) synthetic polyolefin resin, (B) a finely divided filler comprising an inorganic material containing functional hydroxyl groups capable of binding said activator metal and having a secondary particle size of between 0.1 and 150μ and (C) a synthetic resin other than said resin (A) but compatible therewith and with said filler (B) having a softening range between about 30°–100° C. and which is capable of being oxidatively attacked by said cleaning and conditioning liquid, wherein said synthetic resin (C) is present in an amount of 1–40 weight percent referred to said synthetic resin (A) and said filler (B) is present in an amount of 5 to 70 weight percent referred to said synthetic resin (A).

2. Method according to claim 1 wherein said synthetic resin (C) is selected from the group consisting of polyvinyl acetate, polyisobutylene, copolymers of olefins and copolymers of vinyl chloride with vinyl acetate, isobutylene, acrylic acid esters, methacrylic acid esters, butadiene and acrylonitrile and polymer mixtures of polyolefins and of polyvinyl chloride with polyvinyl acetate, polyisobutylene, polyacrylic acid esters and polyacrylonitrile.

3. Method according to claim 1 wherein said synthetic resin (C) is present in an amount of 5–15 weight percent referred to said synthetic resin (A).

4. Method according to claim 1 wherein said filler (B) is at least one member selected from the group consisting of alkali metal-, alkaline earth metal- and alumo-silicates.

5. Method according to claim 1 wherein said filler (B) is present in an amount of 5 to 30 weight percent referred to said synthetic resin (A).

6. Method according to claim 1 wherein said synthetic resin (C) contains functional groups selected from hydroxyl, carboxyl and sulfonic acid groups.

7. Method according to claim 1 wherein said filler (B) is a finely divided inorganic material having a secondary particle size of between 0.2 and 30μ.

8. Method according to claim 1 wherein said filler (B) is a metal oxide, a metalloid oxide or a mixture thereof.

9. Method according to claim 1 wherein the filler is a wet-precipitated or pyrogenic silica, titanium dioxide, alumina, mixture of such oxides, co-oxides formed by said oxides or coagulate formed by said oxides.

10. Method according to claim 1 wherein said electric conducting metal is copper.

* * * * *